(12) United States Patent
Ollila

(10) Patent No.: US 6,314,820 B1
(45) Date of Patent: Nov. 13, 2001

(54) LATERAL MODE STABILIZER FOR CORIOLIS FLOWMETER

(75) Inventor: Curtis John Ollila, Westminster, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/247,429

(22) Filed: Feb. 10, 1999

(51) Int. Cl.$^7$ .................................................. G01F 1/84
(52) U.S. Cl. ............................................. 73/861.357
(58) Field of Search ..................... 73/861.357, 861.355, 73/861.354, 861.351

(56) References Cited

U.S. PATENT DOCUMENTS

| | | | |
|---|---|---|---|
| 5,398,554 | * | 3/1995 | Ogawa et al. ............... 73/861.357 |
| 5,476,013 | * | 12/1995 | Hussain et al. ............. 73/861.357 |
| 5,691,485 | * | 11/1997 | Endo et al. ................. 73/861.357 |
| 5,731,527 | | 3/1998 | Van Cleve . |
| 5,773,727 | * | 7/1998 | Kishiro et al. .............. 73/861.355 |
| 5,945,609 | | 8/1999 | Kashimura et al. . |
| 5,979,246 | | 11/1999 | Van Cleve et al. . |
| 6,170,339 | * | 1/2001 | van der Pol et al. ......... 73/861.357 |

FOREIGN PATENT DOCUMENTS

| | | |
|---|---|---|
| 197 38 332 A1 | 3/1998 | (DE) . |
| 0 598 287 A1 | 5/1994 | (EP) . |
| 0 733 886 A2 | 9/1996 | (EP) . |

* cited by examiner

*Primary Examiner*—Harshad Patel
(74) *Attorney, Agent, or Firm*—Chrisman, Bynum & Johnson P. C.

(57) ABSTRACT

Signal processing of Coriolis flowmeter output signals is improved by increasing the frequency separation between the flow tube drive frequency and unwanted lateral mode vibration frequencies. A cylindrical lateral mode stabilizer surrounds the flow tube near each flow tube end and is positioned between the flow tube and a surrounding balance bar. Axially lateral extensions on opposing circumferential sides of each lateral mode stabilizer element stiffen the flow tube ends for only lateral vibrations. This raises the lateral mode vibration frequency of the flow tube while leaving the drive mode frequency relatively unaffected.

10 Claims, 6 Drawing Sheets

LATERAL MODE STABILIZER FOR CORIOLIS FLOWMETER

FIELD OF THE INVENTION

This invention pertains to Coriolis flowmeters and, more particularly, to apparatus and a method for altering the lateral mode flow tube vibration frequencies of a Coriolis flowmeter. This invention further pertains to apparatus and a method for increasing the frequency separation between the flow tube resonant drive frequency and the flow tube lateral mode vibration frequencies.

PROBLEM

Coriolis flowmeters are characterized by a flow tube through which material flows while the flow tube is caused to vibrate at its resonant frequency. When material is not flowing, every point on the flow tube vibrates in phase with every other point on the flow tube. Two pick off devices positioned at different points on the flow tube generate sinusoidal signals that have the same phase when no material flows and have a phase difference between them when material flows. This phase difference is due to Coriolis forces generated by material flow through the vibrating flow tube. The magnitude of the phase difference between any two points along the length of the flow tube is substantially proportional to the mass flow rate of the material flow. Coriolis mass flowmeters employ signal processing that determines this phase difference and produces an output signal indicating the mass flow rate along with other information pertaining the material flow.

In operation, the flow tube is driven out of phase with an adjacent parallel member, such as a balance bar for a straight tube Coriolis flowmeter. The drive force is generated by an electro mechanical driver which generates out of phase vibrations of the flow tube and the balance bar at their combined resonant frequency. For discussion purposes, the balance bar and flow tube may be said to be driven in a vertical plane by the driver. These vertical vibrations are relatively large since they are at the first out of phase bending mode of the flow tube and balance bar and they are driven at their resonant frequency.

The Coriolis deflections of the vibrating flow tube with material flow also occur in the same vertical plane as the drive vibrations. The Coriolis deflections occur at the drive frequency but the tube deflection has the shape of a bending mode with a higher frequency. Therefore the amplitude of the Coriolis deflections is considerably less than the amplitude of the flow tube drive frequency vibrations. Even though the amplitude of the Coriolis response is relatively small, it is the Coriolis response that generates the pick off output signals that are processed by meter electronics apparatus to generate the desired mass flow rate and other information pertaining to the flowing material. The output error of a Coriolis flowmeter may typically be 0.15% or less. In order to achieve this accuracy, it is necessary that the Coriolis pick off signals be free as possible from noise and unwanted signals that can impair processing of the Coriolis pick off signals.

In the operation of a Coriolis flowmeter, the signals induced in the pick offs comprise not only the desired small amplitude Coriolis response signals, but also comprise unwanted signals that are applied to the processing circuitry along with the desired Coriolis response signals. The receipt of these unwanted signals impairs the ability of the processing circuitry to generate output signals meeting the objective of less than 0.15% error.

The unwanted pick off signals may be caused by ambient noise from the surrounding environment. Ambient noise may be due to near by machinery and vibrations caused by nearby automobile and railroad traffic. It may also be caused by vibrations in the pipeline to which the Coriolis flowmeter is connected. Ambient noise can be overcome by proper mounting of the flowmeter to isolate it from the vibrations caused by machinery and traffic. The noise from connected pipeline vibrations can be overcome by appropriate isolation of the flowmeter from the pipeline.

Another source for the unwanted signals is unwanted vibrations in the flowmeter. These unwanted vibrations are more difficult to overcome and can be minimized, but not eliminated, by improved flowmeter design.

All Coriolis flowmeters have mode shapes that result from driving the flow tube at its resonant frequency. A typical flowmeter has vibrational modes that are characterized by their shape as follows:

In phase bend (IPB)
In-phase lateral (IPL)
Out-of phase bend (Drive)
Out-of phase lateral (OPL)
Balance bar second (bend)

The out of phase bend is the desired drive mode; the rest are unwanted modes. All of these modes are inherent to any Coriolis flowmeter; but good design can minimize, but not eliminate, the unwanted modes. Also, the frequency of these modes changes with the density of the flowing material. When a mode changes frequency, there is a potential for interaction between neighboring modes that may cause the flowmeter to become unstable and produce incorrect output date. As mentioned above, the mode that is desired and used to generate the desired output information of the flowmeter is the out of phase bend drive mode. It is this mode that generates the Coriolis forces. The resulting Coriolis response is detected by the pick offs which generate the signals that are used to provide the flowmeter output information.

The in phase lateral and the out of phase lateral vibrations are a problem that must be address in the design of any flowmeter. It is an objective of good Coriolis flowmeter design to ensure that the drive frequency is separated from the lower in-phase lateral frequency and the higher out-of phase lateral frequency by an amount sufficient to avoid or minimize the adverse effects of the two different lateral frequencies on the processing of the Coriolis separate response signal. This is necessary so that the electronic processing circuitry can generate output signals having the required error of less than 0.15%.

The unwanted lateral vibrations can be excited by the drive frequency due to asymmetry of the various flowmeter parts as well as by the ambient noise. The existence of the lateral vibrations is tolerable as long as the frequencies are separated from the drive frequency by sufficient amount. If this separation is inadequate, the proximity of the lateral frequencies to the drive signal frequency can produce beat frequencies and interactions that produce unwanted pick-offs signals that are applied to the electronic processing circuitry along with the desired Coriolis response signal. If these undesired lateral mode signals have an excessive amplitude and/or are close to the frequency of the Coriolis response signal, the electronic processing circuitry may be unable to process the Coriolis signal to generate output information having the desired accuracy.

It may be seen from the above that it is a problem in the design and operation of Coriolis flowmeters to minimize the adverse impact of signals generated by undesired modes of vibration so that the processing of the Coriolis response signal and the output accuracy of the output signal of the flowmeter is not compromised.

SOLUTION

The above problem is solved and an advance in the art is achieved by the present invention which comprises apparatus and a method for altering the vibrational characteristics of Coriolis flowmeter flow tubes so that the drive and Coriolis response frequency is separated by an adequate amount from both the in-phase and out-of phase lateral vibration frequencies. This increased separation enhances the ability of the associated meter electronics to process the Coriolis response signal so that it can achieve the desired output accuracy.

As above described, the unwanted signals that can interfere with the processing of the Coriolis response signals are due to two causes. The first is caused by the presence of ambient noise. The second is due to unwanted vibrations in the structure of the flowmeter. Both of these causes can produce unwanted signals which can impair signal processing of the Coriolis response signal.

Ambient noise can be reduced to an acceptable level by improved mechanical isolation of the Coriolis flowmeter from the source of the noise. The signals generated by the unwanted flowmeter vibrations are primarily due to asymmetry in the flowmeter structure. This asymmetry may be due to imperfect mounting of the driver and/or pick offs in the vertical plane. This asymmetry may also be due to imperfect welds or braze operations in the meter fabrication. As a result of this asymmetry, a driver, for example, may vibrate the flow tube in a desired vertical plane; but may also vibrate the flow tube to a lesser extent in an undesired lateral plane. Similarly, the attachment of the pick offs to the flow tube may be less than perfect so that the pick offs respond primarily to motion in the vertical plane, but they also respond to motion in the lateral plane. In other words, no Coriolis flowmeter achieves total perfection in either its fabrication and/or operation and, as a result, elements of the flowmeter which should operate only in a vertical plane also have a response, even though small, in a plane that is perpendicular to the vertical plane. As a result, these elements have an undesired lateral component to their vibration as well as the desired vertical component. This lateral component, all though small, can cause unwanted signals in the pick off outputs.

The solution to the unavoidable presence of lateral vibrations is to alter the flowmeter structural characteristics to achieve control over the lateral vibration frequencies. This enables the lateral vibration frequencies to be separated a greater amount from the frequency of the drive signal and the Coriolis response signal. The increased frequency separation reduces both the lateral vibration amplitude and beat frequencies and their interactions with the Coriolis response signal. The increased separation of the lateral mode frequencies from the drive and Coriolis response frequencies also permits easier processing of the Coriolis response signal by the associated meter electronics. A lateral mode frequency that is unacceptably close to the Coriolis response signal frequency requires an extremely narrow band width and selectivity in the signal processing circuitry. This narrow band width and selectivity is difficult and expensive to achieve.

Conversely, when lateral mode vibration frequencies are separated by an adequate amount from the Coriolis response frequency, the band width and selectivity requirements of the meter electronics element is reduced so that the Coriolis response signal can be processed to achieve the desired accuracy in the flowmeter output information. The reason for this is that the increased frequency separation permits the selectivity of the meter electronics to reject, or reduce to an acceptable level, the lateral mode signals.

The apparatus and method of the present invention achieves control of the lateral vibration frequencies by the use of a concentric ring affixed over the ends of the flow tube with lateral axial extensions on the ring contacting the flow tube on each of its sides. These lateral axial extensions increase the flow tubes stiffness for lateral vibrations significantly and only moderately affect the flow tube vibrations in the vertical (drive) plane. As a result, an increased separation is achieved between the vertical flow tube (drive) frequency and the flow tube lateral vibration frequencies. This increased frequency separation eliminates the undesirable consequences of the lateral mode vibration frequencies by making signal processing of the Coriolis response signal easier with enhanced accuracy in the flowmeter output information.

It can be seen that a first aspect of the invention includes a Coriolis flowmeter having:

a flow tube for receiving a material flow;

a balance bar coupled to said flow tube;

a driver that vibrates said flow tube and said balance bar in a drive plane in phase opposition to each other;

said vibrations in said drive plane and said material flow are jointly effective for inducing Coriolis deflections of said flow tube;

pick off means coupled to said flow tube that detect said Coriolis deflections;

said pick off means generate signals representing information pertaining to said material flow in response to said detection of said Coriolis deflections;

meter electronics that receive said signals from said pick off means and generates output information pertaining to said material flow;

said Coriolis flowmeter is subject in operation to the presence of unwanted lateral vibrations of said flow tube in a plane offset from said drive plane;

said lateral vibrations generate unwanted signals in said pick off means;

said unwanted signals make difficult the processing of said pick off signals representing said Coriolis deflections when the frequency separation between said drive frequency and said lateral vibrations is less than a desired amount;

said Coriolis flowmeter further includes:

lateral mode stabilizer means coupled to said flow tube and said balance bar;

said lateral mode stabilizer means alters the frequency of said lateral vibrations and thereby increases the frequency separation between said drive frequency vibrations and the frequency of said lateral vibrations beyond said desired amount to facilitate the processing of said Coriolis signals by said meter electronics.

A second aspect of the invention includes, the Coriolis flowmeter of the first aspect wherein said lateral mode stabilizer means includes extension means affixed to a first and a second side of said flow tube for raising the resonant frequency of said lateral vibrations.

A third aspect of the invention includes, the Coriolis flowmeter of the first aspect wherein said lateral mode stabilizer means includes:

a first lateral mode stabilizer that couples a first end of said balance bar to a first portion of said flow tube;

a second lateral mode stabilizer that couples a second end of said balance bar to a second portion said flow tube;

a ring portion on each lateral mode stabilizer having a circular opening for receiving said flow tube;

a first and a second lateral extension on each lateral mode stabilizer extending axially inward from said ring portion towards an axial center of said flow tube along the sides of said flow tube;

said lateral extensions are effective to raise the resonant frequency of the lateral vibrations.

A fourth aspect of the invention includes, the Coriolis flowmeter of the first aspect wherein:

said lateral mode stabilizer means comprises a first lateral mode stabilizer coupled to a first end of said balance bar and a second lateral mode stabilizer coupled to a second end of said balance bar;

said first end and said second end of said balance bar are coupled to a first portion and a second portion, respectively, of said flow tube;

said balance bar is oriented substantially parallel to said flow tube;

each said lateral mode stabilizer has a cylindrical outer surface and further has a circular opening for receiving said flow tube;

a cylindrical wall portion of each said lateral mode stabilizer positioned between an outer wall of said flow tube and an inner wall of said balance bar;

each said lateral mode stabilizer includes extensions defining lateral circumferential segments that extend axially inwardly along opposing circumferential portions of said flow tube towards a center of said flow tube;

said extensions are effective to raise the lateral resonant frequency of said flow tube while leaving the resonant frequency of said drive vibrations substantially unaltered;

top and bottom circumferential top and bottom segments of each said lateral mode stabilizer defining voids circumferentially adjacent said lateral circumferential segments defined by said extensions.

A fifth aspect of the invention includes, the flowmeter of the first aspect wherein:

said lateral mode stabilizer means comprises a first lateral mode stabilizer and a second lateral mode stabilizer;

each lateral mode stabilizer defines a cylindrical a ring-like element having a circular opening adapted to receive said flow tube;

a pair of lateral extensions on said ring-like element oriented circumferentially opposite each other and extending axially inwardly from said ring element along opposing lateral surfaces of said flow tube towards an axial center of said flow tube;

a pair of void elements positioned circumferentially opposite each other and extending axially inwardly from said ring element towards said axial center of said flow tube with said void elements being circumferentially positioned between said pair of extensions;

said lateral extensions stiffen said flow tube with respect to said lateral vibrations while leaving the stiffness of said flow tube relatively unaffected with respect to vibrations in said drive plane;

said pair of void elements permit and said lateral extensions permit said flow tube to be relatively unaffected with respect to vibrations of said flow tube in said drive plane;

the stiffening of said flow tube for lateral vibrations raises the resonant frequency of said lateral vibrations of said flow tube and causes an increased frequency separation between said Coriolis response frequency and said lateral vibration frequencies of said flow tube.

A sixth aspect of the invention includes, the Coriolis flowmeter of the first aspect and further includes:

a substantially cylindrical case enclosing said flow tube and said balance bar and said lateral mode stabilizer means;

it a first and a second case connect link coupled to a first end and a second end of said balance bar and to said flow tube and said lateral mode stabilizer means;

a first end of said case connect link is connected to a first inner wall portion of said case;

a second end of said case connect link is connected to a second inner wall portion of said case circumferentially opposite said first inner wall portion.

In a seventh aspect, the flowmeter of the sixth aspect wherein said case connect link defines:

a substantially flat element extending from said first end to said second end;

a substantially circular opening in a mid portion of said flat element;

said circular opining receives said flow tube and said ring portion of said lateral mode stabilizer means.

An eighth aspect the inventor includes a method of increasing the frequency separation between a desired drive frequency and an undesired lateral vibration frequency of a Coriolis flowmeter;

said method comprising the steps of;

driving a flow tube of said Coriolis flowmeter in a drive plane at a resonant frequency of said flow tube and a balance bar coupled to said flow tube;

coupling a lateral mode stabilizer means to circumferential side portions of said flow tube for stiffening said side portions with respect to lateral vibrations;

said stiffening being effective for raising the lateral vibration frequency of said flow tube beyond the lateral vibration frequency of said flow tube when devoid of a coupling with said lateral mode stabilizer means.

A ninth aspect of the invention includes, the method of the eighth aspect wherein the step of coupling comprises the step of coupling circumferential lateral extensions on said lateral mode stabilizer means to opposing circumferential sides of said flow tube to stiffen said sides of said flow tube with respect to lateral vibrations.

A tenth aspect of the invention includes, the method of the ninth aspect and further includes the steps of coupling said flow tube and said lateral mode stabilizer means as well as a balance bar of said Coriolis flowmeter to a case connect link; and coupling opposing ends of said case connect link to an inner surface of a case enclosing said Coriolis flowmeter.

DESCRIPTION OF THE DRAWINGS

These and other objects and features and advantages of the invention may better be understood from a reading of the following detail description of one possible exemplary embodiment thereof taken in conjunction with the drawings in which.

DETAILED DESCRIPTION

Figure 1:
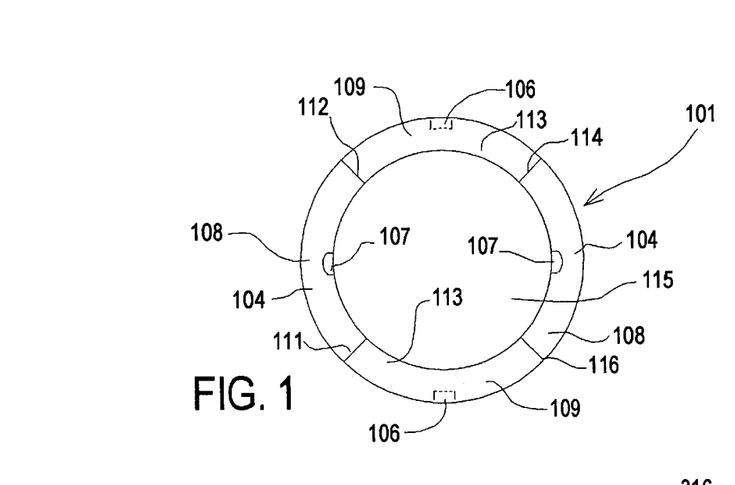
FIGS. 1 and 2 disclose the lateral mode stabilizer provided in accordance with the present invention.
Figure 2:
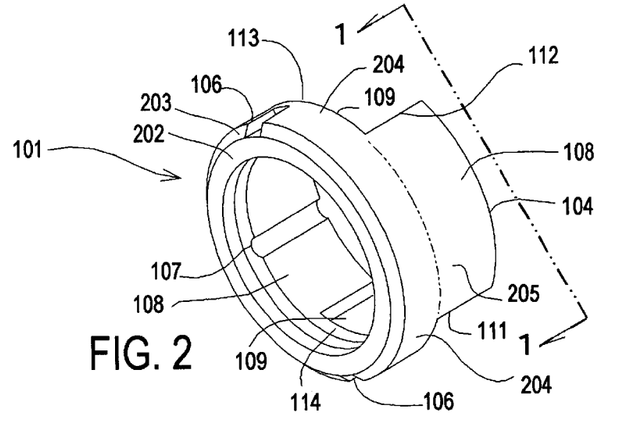
Figure 3:
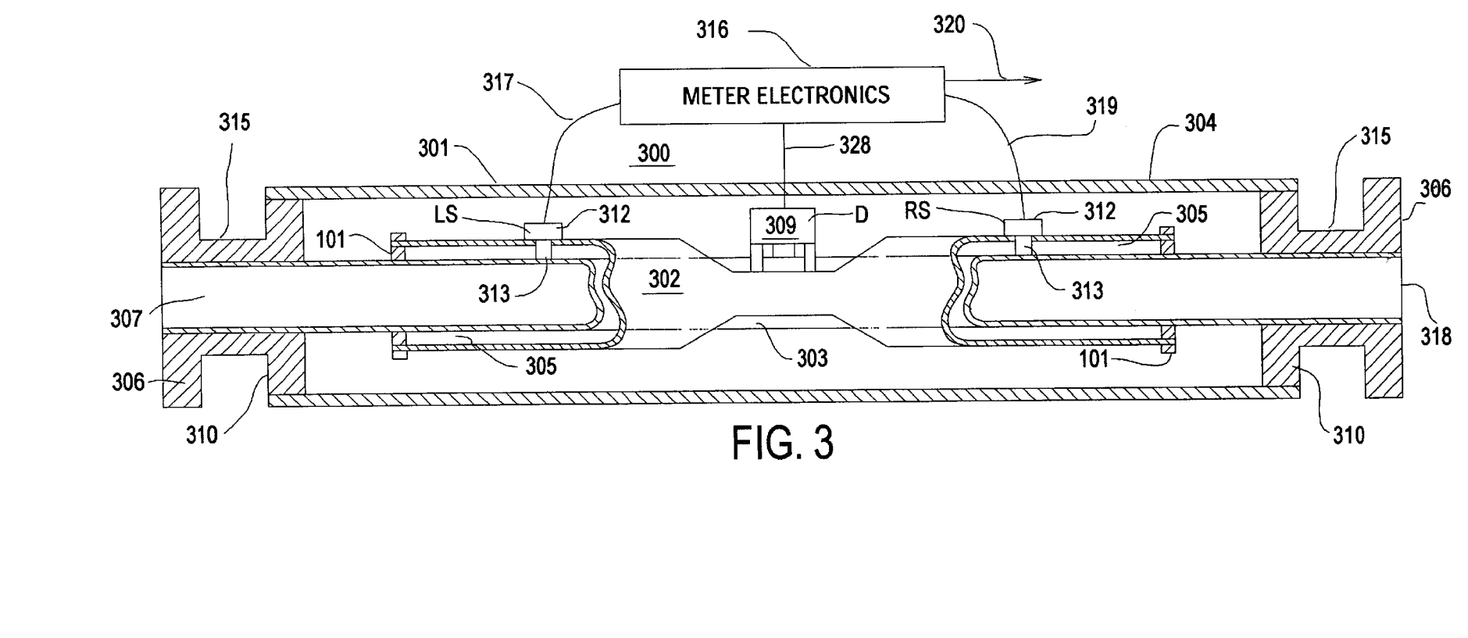
FIG. 3 is a side cross section view of a single straight tube Coriolis flowmeter embodying the invention.

Description of FIGS. 1, 2 and 3

The present invention comprises a Coriolis flowmeter embodying the lateral mode stabilizer of the present invention for altering the lateral resonant frequency of the flow tube while leaving the resonant vertical drive frequency and Coriolis response frequency of the flow tube substantially unchanged. The lateral mode stabilizer is shown in FIGS. 1 and 2. FIGS. 3 through 8 show the lateral mode stabilizer embodied in a straight tube Coriolis flowmeter.

The lateral mode stabilizer of FIGS. 1 and 2 comprises a cylindrical member 101 having a center portion 115 adapted to receive flow tube 303 of FIGS. 3–8. Cylindrical member 101 has an exterior surface comprising a ring portion 204 (shown in FIG. 2) and a pair of lateral side extensions 108 each having an end 104 and lateral surface 205. Lateral mode stabilizer 101 has a groove 106 on its top and bottom portion for receiving teeth 411 of a case connect link 401 as best shown on FIGS. 4, and 6. Lateral mode stabilizer member 101 has a pair of side grooves 107 which are used to facilitate a brazing operation when member 101 is affixed to flow tube 303 during the manufacturing process.

FIG. 1 is an end view lateral mode stabilizer 101 as viewed from line 1—1 on FIG. 2. Elements 109 on FIG. 1 are void quadrant portions of member 101 and are positioned circumferentially between the two quadrants comprising lateral extensions 108 of element 101. As shown on FIGS. 1 and 2, each circumferential void 109 comprises a circumferential segment or quadrant positioned at the top and bottom of element 101 between the two lateral quadrants comprising extensions 108. The two lateral extensions 108 are shown on the left and right side of FIG. 1 with element 104 being the right rear edge of each extension 108 on FIG. 2.

On FIG. 2, lateral mode stabilizer element 101 has an exterior surface which may be functionally dividable into a ring element 204 and the pair of lateral extensions 108 having outer surface 205. The left end of element 101 on FIG. 2 comprises a end surface 202 substantially perpendicular to ring surface 204 as well as an inclined surface 203 interconnecting the outer circumferential portion of end surface 202 with the left end of ring surface portion 204. Surfaces 202 and 203 together with grooves 106 permit case connect link 401 and its teeth 411 on FIG. 6 to engage grooves 106 of lateral mode stabilizer element 101. Elements 111,112,114 and 116 comprise the upper and lower edges of lateral extensions 108.

FIG. 3 is a cross sectional view of a straight tube Coriolis flowmeter 300 embodying the present invention. Flowmeter 300 comprises case 301 which encloses flow tube 303 and a surrounding concentric balance bar 302 which are joined at the left and right ends of balance bar 302 to lateral mode stabilizer element 101. Flow tube 303 extends through case end 310 and neck portion 315 and terminates in flange elements 306. The left end of flow tube 303 is element 307; the right end of flow tube 303 is element 318. A pair of pick offs LS and RS comprises left and right coils 312 and left and right magnets 313. The flowmeter further includes a driver D, 309, coupled to the balance bar 302 and flow tube 303 for driving the balance bar and flow tubes out of phase with respect to each other at the first bending mode resonant frequency of the flow tube/balance bar structure.

A drive signal is generated by meter electronics 316 and applied over conductor 328 to driver 309 to vibrate the flow tube/balance bar pair at its first bending mode resonant frequency. The meter electronics receives signals from pick off LS and RS over paths 317 and 319 representing the Coriolis displacement of the vibrating flow tube with material flow. The meter electronics 316 processes these signals to generate mass flow and other desired information pertaining to the material flow. Flowmeter output information is applied over path 320 to a utilization circuit not shown.

Element 304 comprises the wall of case 301. Since FIG. 3 is a cross sectional side view of flow tube 303, the connection of lateral mode stabilizer 101 to case connect link 401 is not shown. Also not shown on FIG. 3 is the connection of the end portion 407 of case connect link 401 to the rear inner wall 321 of case 301. Element 305 represents the space between the inner surface of balance bar 302 and the outer surface of flow tube 302.

Figure 4:
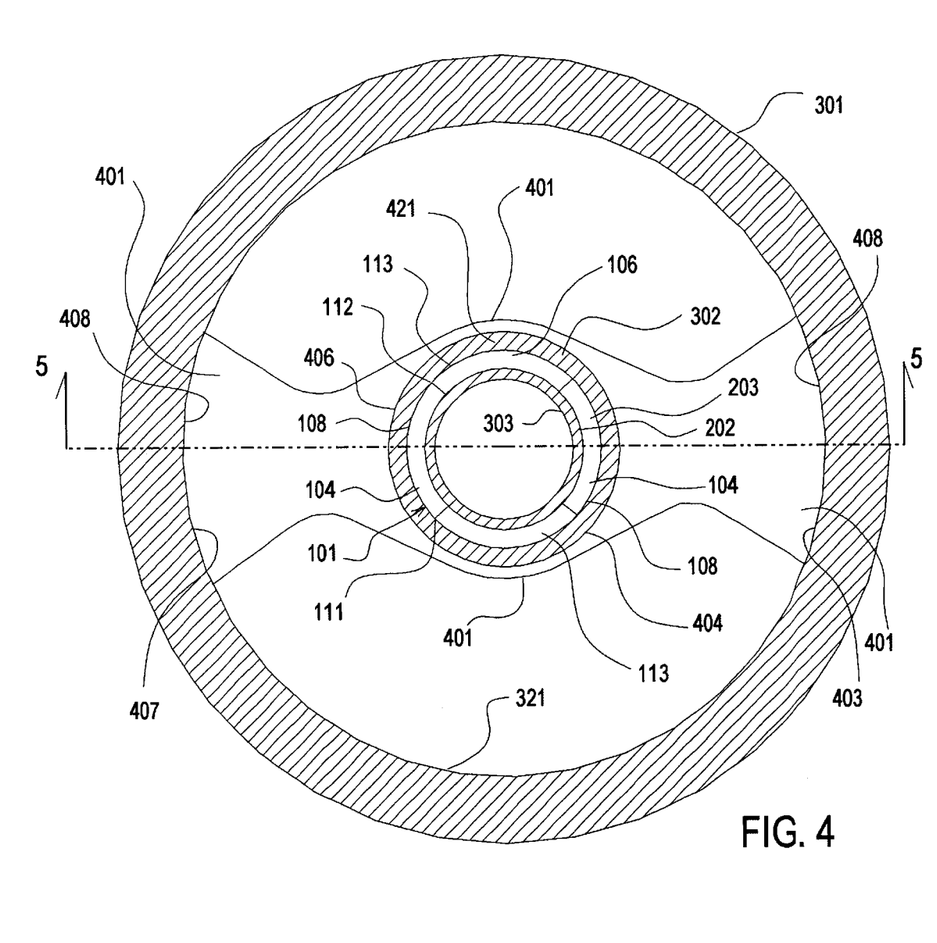
FIG. 4 is a view of the flowmeter taken along line 4—4 of FIG. 9.
Figure 5:
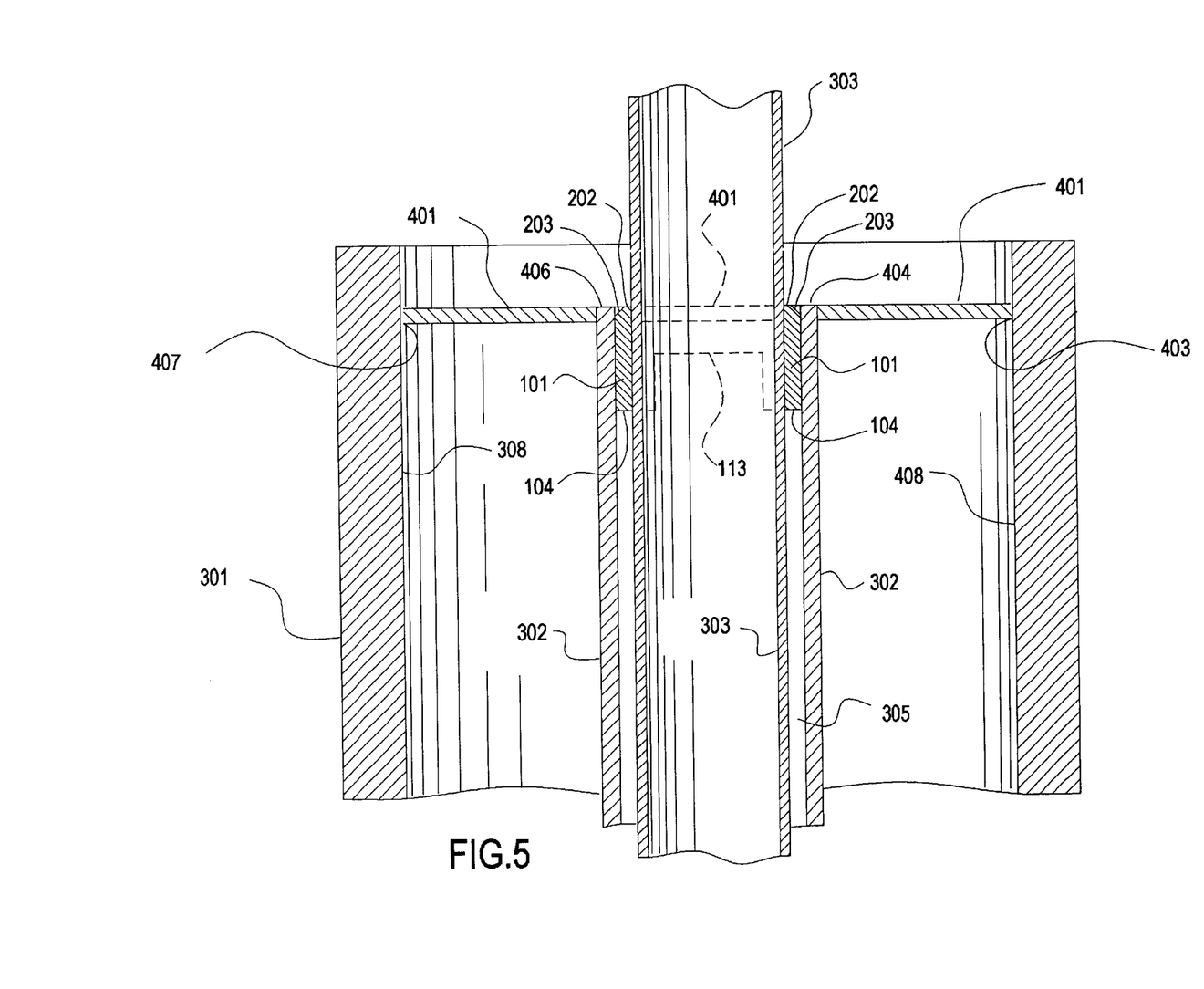
FIG. 5 is a cross section side view of a flowmeter embodying the invention.

Description of FIGS. 4 and 5

FIG. 4 discloses a butterfly shaped case connect link 401 having a left end 407 connected to the inner wall 408 of flowmeter case 301. The right end 403 of case connect link 401 as shown on FIG. 4 is also attached to the inner wall 408 of case 301. FIGS. 4 and 5 together disclose how lateral mode stabilizer element 101 is coupled to flow tube 303, balance bar 302 and case connect link 401. FIG. 4 is an end view of the structure of FIG. 5 taken along lines 4—4 of FIG. 5. In other words, FIG. 4 is a cross sectioned end view of the flowmeter structure taken from a mid portion of the flowmeter. On FIG. 4, the center portion of flow tube 303 is shown with the innermost pair of concentric lines being a cross sectional of the wall of flow tube 303. Affixed to the left and right side portions of the wall of flow tube 303 are the left and right lateral extensions 108 of the cylindrical lateral mode stabilizer element 101. The circumferential edge portions of the left lateral extension 108 are represented by the lines 111 and 112 on FIG. 4. The corresponding lines on the right side this figures are the circumferential extremities of the right lateral extension 108 whose edges are 114 and 116. Element 113 on FIG. 4 is the surface of bottom void 109 as shown on FIG. 2. The upper most element 113 is the inner surface of the top void 109 as shown on FIG. 2.

The next pair of circumferential lines extending outwardly from the center of flow tube 303 are the walls of balance bar 302. The outermost pair of circumferential lines on the top and bottom of FIG. 4 define the portion of case connect link 401 that is affixed to the top and bottom portions of balance bar 302. Element 409 on the left side of FIG. 4 defines the junction between the left end of case connect link 401 and the inner surface 321 of case wall 408. Element 410 on the right side of FIG. 4 defines the junction between the right end of case connect link 401 and the inner surface 321 of case 301.

Figure 6:
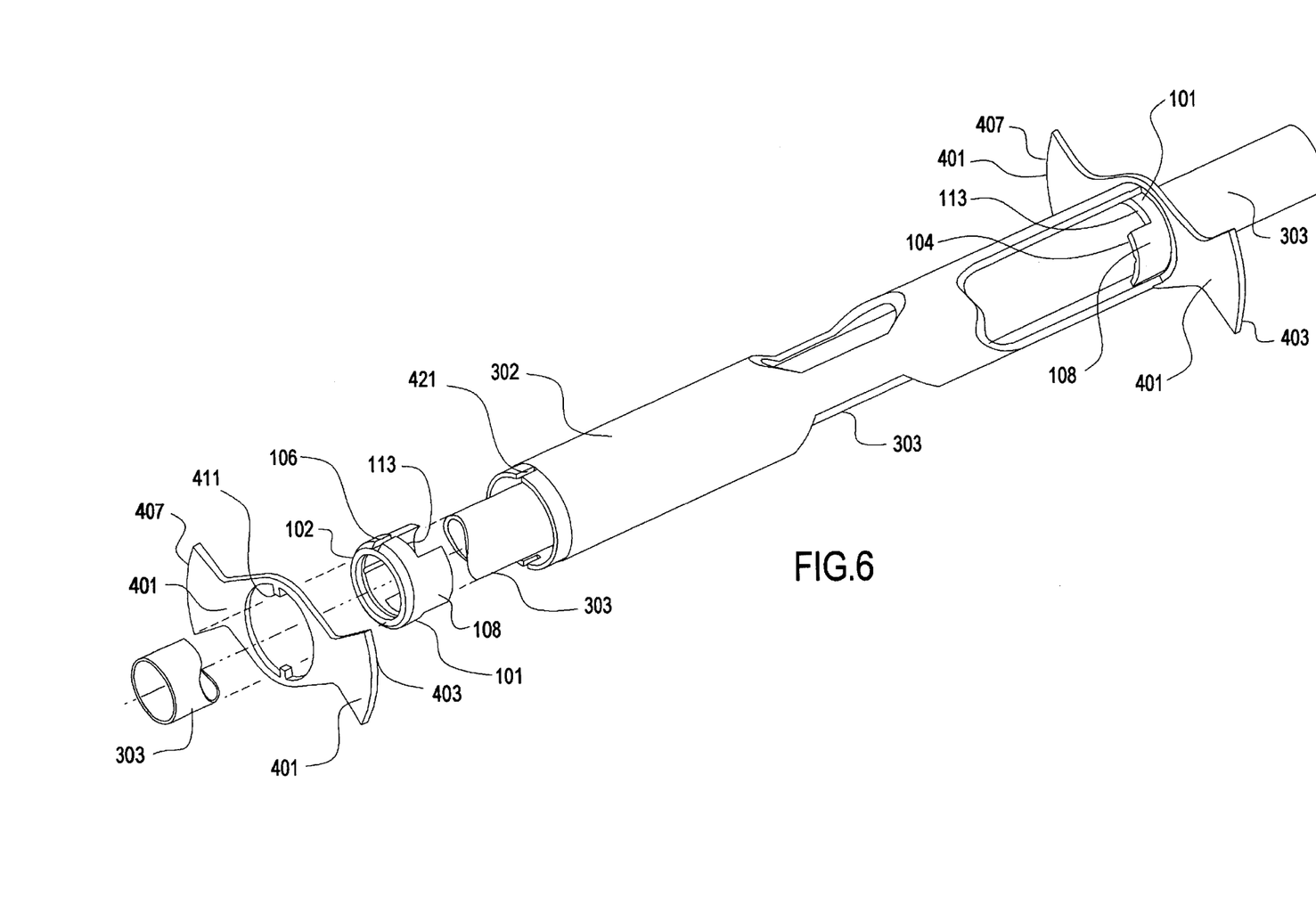
FIG. 6 is an isometric pictorial view of the flowmeter of FIG. 3 embodying the lateral mode stabilizer of FIGS. 1 and 2.

Description of FIG. 6

FIG. 6 disclose flow tube 303, and balance bar 302 together with a detail showing how case connect link 401 and lateral mode stabilizer 101 couple the ends of balance bar 302 and to flow tube 303. The lateral extensions 108 of lateral mode stabilizer 101 are clearly shown as are the axially inner ends 104 of the right lateral side extension 108. Also shown are the inner ends 113 of voids 109 of lateral mode stabilizer 101. The teeth 411 on case connect link 401 are adapted to enter grooves 106 of lateral mode stabilizer 101.

Figure 7:
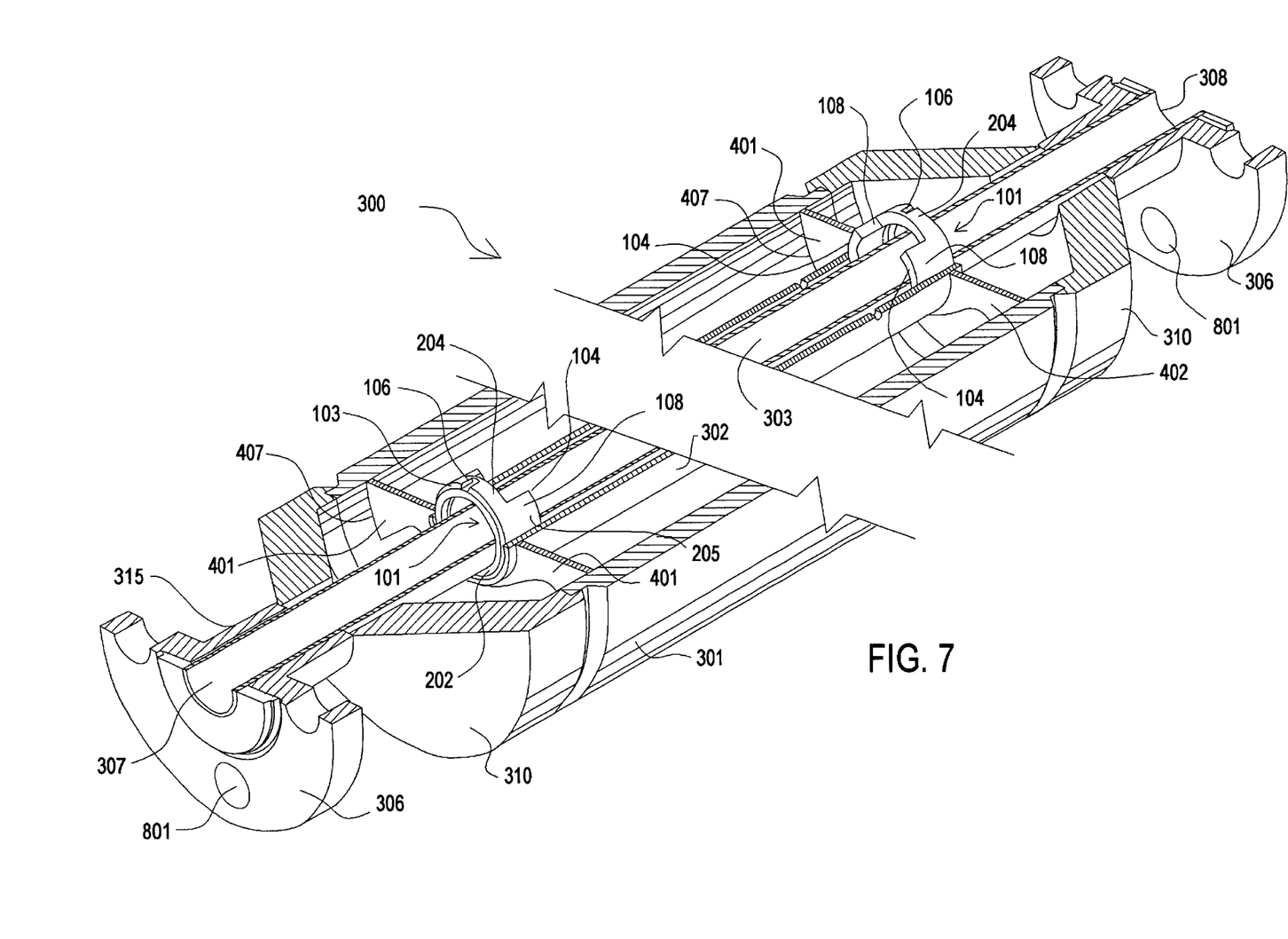
FIGS. 7 and 8 are additional isometric pictorial views showing the Coriolis flowmeter of FIG. 3 and embodying the lateral mode stabilizer of FIGS. 1 and 2.
Figure 8:
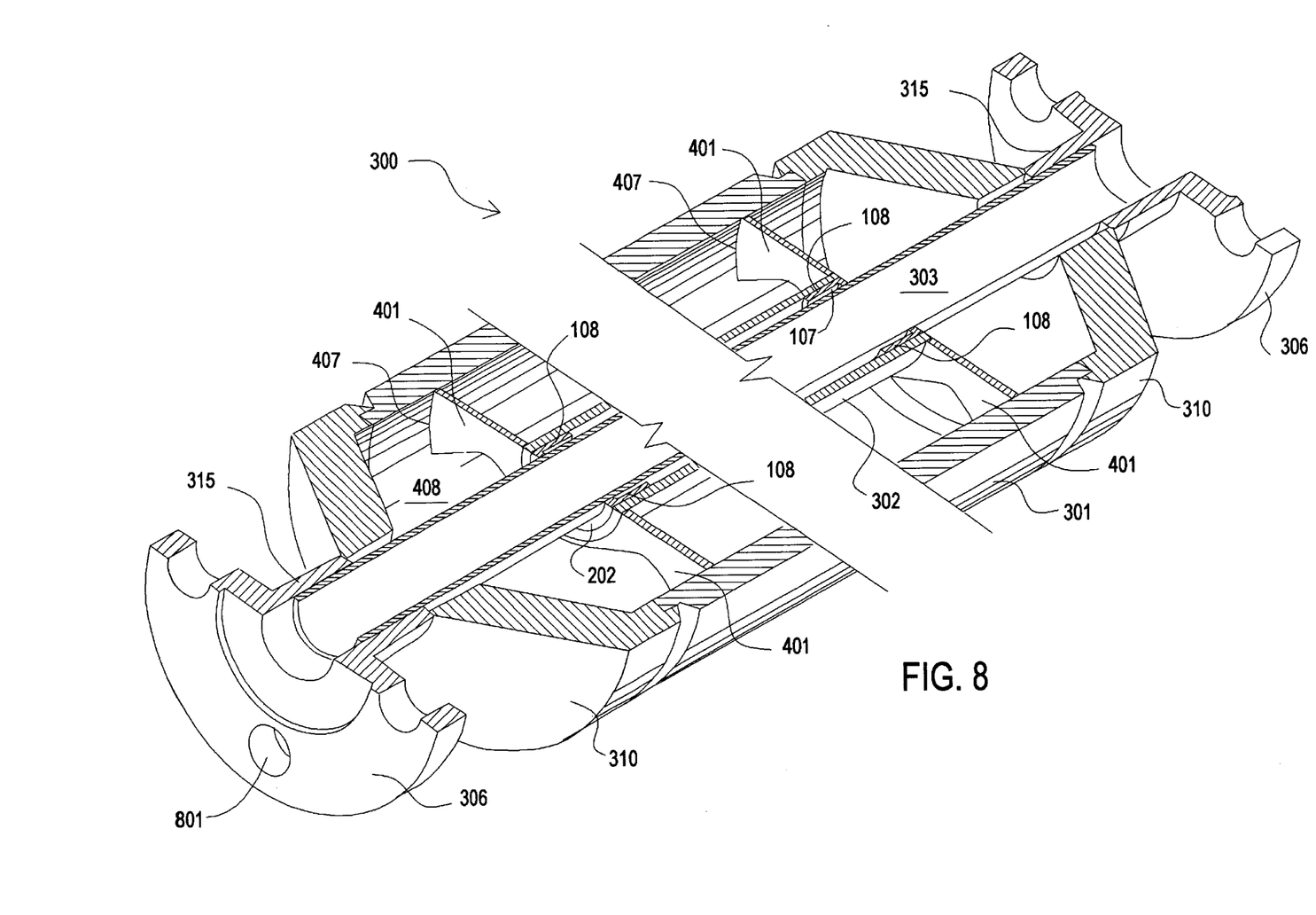

Description of FIGS. 7 and 8

Shown on FIGS. 7 and 8 are straight tube Coriolis flowmeter 300 having a case 301 enclosing flow tube 303 and its concentric balance bar 302. Flow tube 303 extends from within case 301 through the left and right case ends 310 and neck portions 315 30 to flanges 306. On FIG. 7, element 307 is the left end of flow tube 303 and element 308 is the right end of flow tube 303. Flanges 306 enable flow tube 303 to be connected to a pipeline for receiving the material to be processed by flowmeter 300. Holes 801 in flanges 306 enable the flowmeter to be coupled to the pipeline.

Lateral mode stabilizer element 101 is shown coupled to each end of balance bar 302. Lateral mode stabilizer 101 couples balance bar 302 to flow tube 303 and to case connect link 401. The left end 407 of each case connect link 401 is shown connected to the inner wall 321 of case 301 at junction 409 on FIG. 4. The junction 410 of the right end 403 of case connect link 401 on FIG. 4 is where the inner wall 321 of case 301 meets the right end of case connect link 401.

FIGS. 7 and 8 show the details of lateral mode stabilizer element 101 and its connection to flow tube 303 and balance bar 302. On FIG. 7, lateral mode stabilizer 101 is shown coupled to the left and right ends of balance bar 302. Lateral mode stabilizer 101 is affixed to the end of balance bar 302 and positioned between balance bar 302 and flow tube 303. The circumferential ring 204 of stabilizer 101 completely encircles flow tube 303. The lateral extension 108 on each side of stabilizer 101 projects axially inwardly towards the center of flow tube 303.

The showing of FIGS. 7 and 8 is essentially the same except that FIG. 8 is a cross sectional view of all flowmeter elements while on FIG. 7, the lateral mode stabilizer 101 are shown in greater detail. Accordingly, the braze groove 107 on FIG. 1 appears on FIG. 8 as a narrow void between flow tube 303 and lateral extensions 108.

It can be seen from the preceding description of flowmeter 300 that the presence of lateral mode stabilizer 101 enables the vertical vibrations of the flow tube 303 to be relatively unaffected by lateral mode stabilizer 101 and its lateral extensions 108. It can also be seen that the lateral extensions 108 are affective in altering the lateral vibrational characteristics of flow tube 303 as shown on FIGS. 7 and 8. These lateral extension 108 stiffen the lateral portions of the flow tube 303 to which they are affixed. In so doing, the vibration node or pivot point for lateral vibrations of flow tube 303 is effectively moved inwardly to the inner end 104 of each lateral extension 108. This effectively shortens the vibration length of flow tube 303 for lateral vibrations and raises the resonant frequency of the lateral vibrations.

Figure 9:
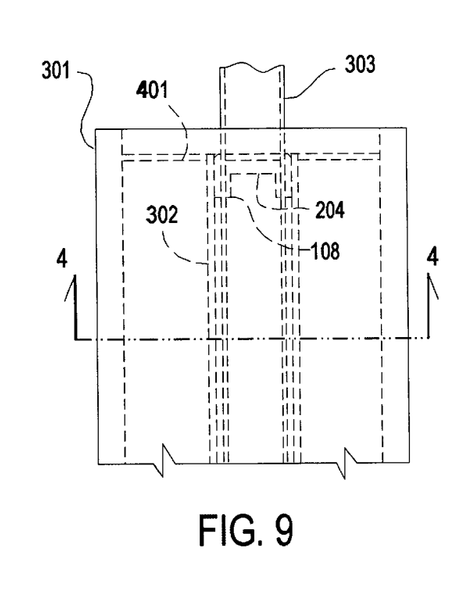
FIG. 9 is a side view of a portion of a flowmeter embodying the invention.

Description of FIG. 9

FIG. 9 is an exterior top view of the flowmeter of FIG. 4. Shown on FIG. 9 are case 301, case connect link 401, flow tube 303, balance bar 302, ring portion 204 and lateral extensions 108 of case connect link 401.

TABLE 1

| Baseline Flowmeter | SG | IPL | ΔF | Drive F | ΔF | OPL |
|---|---|---|---|---|---|---|
| | .5 | 398 | 141 | 539 | 7 | 546 |
| | 1.0 | 377 | 96 | 473 | 19 | 492 |
| | 1.5 | 351 | 83 | 434 | 35 | 469 |

TABLE 2

| Flowmeter with lateral mode stabilizer | SG | IPC | ΔF | Drive F | ΔF | OPC |
|---|---|---|---|---|---|---|
| | .5 | 436 | 178 | 614 | 46 | 660 |
| | 1.0 | 418 | 122 | 540 | 48 | 588 |
| | 1.5 | 397 | 98 | 495 | 55 | 550 |

Tables 1 and 2 show the benefits provided by the lateral mode stabilizer of the present invention. Table 1 shows the figures obtained from a base line uncompensated flowmeter for materials having a specific gravity of 0.5, 1.0, and 1.5. Table 2 shows the results of a flowmeter embodying the lateral mode stabilizer of the present invention.

In both tables 1 and 2, the columns designated SG represents the specific gravity, the column designated IPL represents the in-phase lateral resonant frequency, the column designated Drive F represents the resonant drive frequency and the column designated OPL represents an out of phase lateral resonant frequency. The left most column designated ΔF represents the frequency difference between the in-phase lateral frequency and the drive frequency. The right most column designated ΔF represents the frequency difference between the drive frequency and the out of phase lateral resonant frequency.

Table 1 indicates that for a specific gravity of 0.5, the ΔF between the IPL and the drive frequency Drive F is 141. This is an acceptable frequency separation so far as concerns the selectivity of the meter electronics element for the processing of the pick off signals. However, the ΔF between the Drive F and the OPL frequencies for an SG of 0.5 is only 7. This is an unacceptable frequency separation. It is also so seen that the ΔF between the Drive F and the OPL frequencies is 19 and 35 for specific gravities of 1.0 and 1.5 respectfully. There are also unacceptable separations.

Table 2 shows the result obtained when a lateral mode stabilizer is incorporated into a flowmeter comparable to the baseline flowmeter of table 1. It can be seen in table 2 that for all of the indicated values of specific gravity, the ΔF between the IPL and the Drive F frequencies is considerably increased over that for the comparable meter of table 1. Also, it can be seen that the ΔF between the Drive F and OPL frequencies is significantly increased over that for the comparable ΔF of the baseline flowmeter of table 1. The ΔF's of 46, 48, and 55 for specific gravities of 0.5, 1.0 and 1.5 respectfully are raised considerably and represent an adequate frequency separation to enable the meter electronics element 316 to satisfactorily process these signals and obtain output information of the required accuracy.

As can be seen from table 2, the lateral mode stabilizer allows the lateral modes of the flowmeter to be increased as well as the ΔF and Drive F and OPL frequencies to be kept reasonably constant. This allows greater flexibility in design since the lateral frequency of the OPL can be lowered without the complication of potential modal cross over or interference. This results in a meter of increased signal stability.

In summary, it can be seen from the foregoing that the provision of a lateral mode stabilizer in a flowmeter provides increased frequency separation between the wanted and unwanted frequencies and thereby permits the desired Coriolis pick off signals to be precessed with greater ease to generate output data of increased accuracy.

It is to be expressly understood that the claimed invention is not to be limited to the description of the preferred embodiment but encompasses other modifications and alterations within the scope and spirit of the inventive concept. For example, although the present invention has been disclosed as comprising a part of a single straight tube Coriolis flowmeter, it is to be understood that the present invention is not so limited and may be used with other types of Coriolis flowmeters including single tube flowmeters of irregular or curved configuration as well as Coriolis flowmeters having a plurality of flow tubes.

What is claimed is:

1. A Coriolis flowmeter that is subject in operation to unwanted lateral vibrations of a flow tube in a plane offset from a drive plane; said Coriolis flowmeter comprising:

said flow tube for receiving a material flow;

a balance bar coupled to said flow tube;

a driver that vibrates said flow tube and said balance bar at a drive frequency in a drive plane in phase opposition to each other;

said vibrations in said drive plane and said material flow are jointly effective for inducing Coriolis deflections of said flow tube;

pick off means coupled to said flow tube for detecting said Coriolis deflections;

said pick off means generate Coriolis signals representing information pertaining to said material flow in response to said detection of said Coriolis deflections;

meter electronics that receive said Coriolis signals from said pick off means and processes said signals to generate output information pertaining to said material flow;

said lateral vibrations generate unwanted signals in said pick off means;

said unwanted signals make difficult said processing of said pick off signals representing said Coriolis deflections when a frequency separation between said drive frequency and a frequency of said lateral vibrations is less than a desired amount; and lateral mode stabilizer means coupled to said flow tube and said balance bar for altering said frequency of said lateral vibrations and thereby increases the frequency separation between said drive frequency and said frequency of said lateral vibrations beyond said desired amount to facilitate said processing of said Coriolis signals by said meter electronics.

2. The Coriolis flowmeter of claim 1 wherein said lateral mode stabilizer means includes extension means affixed to a first and a second side of said flow tube for raising the frequency of said lateral vibrations.

3. The Coriolis flowmeter of claim 1 wherein said lateral mode stabilizer means includes:

a first lateral mode stabilizer that couples a first end of said balance bar to a first portion of said flow tube;

a second lateral mode stabilizer that couples a second end of said balance bar to a second portion said flow tube;

a ring portion on each lateral mode stabilizer having a circular opening for receiving said flow tube;

a first and a second lateral extension on each lateral mode stabilizer extending axially inward from said ring portion towards an axial center of said flow tube along lateral sides of said flow tube;

said lateral extensions are effective to raise the frequency of said lateral vibrations.

4. The Coriolis flowmeter of claim 1 further wherein:

said lateral mode stabilizer means comprises a first lateral mode stabilizer coupled to a first end of said balance bar and a second lateral mode stabilizer coupled to a second end of said balance bar;

said first end and said second end of said balance bar are coupled to a first portion and a second portion, respectively, of said flow tube;

said balance bar is oriented substantially parallel to said flow tube;

each said lateral mode stabilizer has a cylindrical outer surface and further has a circular opening for receiving said flow tube;

a cylindrical wall portion of each said lateral mode stabilizer positioned between an outer wall of said flow tube and an inner wall of said balance bar;

each said lateral mode stabilizer includes extensions defining lateral circumferential segments that extend axially inwardly along opposing circumferential portions of said flow tube towards a center of said flow tube;

said extensions are effective to raise the frequency of said lateral vibrations while leaving said drive frequency substantially unaltered;

top and bottom circumferential segments of each said lateral mode stabilizer defining voids circumferentially adjacent said lateral circumferential segments defined by said extensions.

5. The Coriolis flowmeter of claim 1 further wherein:

said lateral mode stabilizer means comprises a first lateral mode stabilizer and a second lateral mode stabilizer;

each lateral mode stabilizer defines a cylindrical ring-like element having a circular opening adapted to receive said flow tube;

a pair of lateral extensions on said ring-like element oriented circumferentially opposite each other and extending axially inwardly from said ring element along opposing lateral surfaces of said flow tube towards an axial center of said flow tube;

a pair of void elements positioned circumferentially opposite each other and extending axially inwardly from said ring element towards said axial center of said flow tube with said void elements being circumferentially positioned between said pair of extensions;

said lateral extensions stiffen said flow tube with respect to said lateral vibrations while leaving the stiffness of said flow tube relatively unaffected with respect to vibrations in said drive plane;

said pair of void elements permit and said lateral extensions permit said flow tube to remain relatively unaffected with respect to vibrations of said flow tube in said drive plane;

the stiffening of said flow tube for lateral vibrations raises the frequency of said lateral vibrations to increase the frequency separation between said drive frequency and said lateral vibrations frequency.

6. The Coriolis flowmeter of claim 1 further includes:

a substantially cylindrical case enclosing said flow tube and said balance bar and said lateral mode stabilizer means;

a first and a second case connect link coupled to a first end and a second end of said balance bar and to said flow tube and said lateral mode stabilizer means;

a first end of said case connect link is connected to a first inner wall portion of said case;

a second end of said case connect link is connected to a second inner wall portion of said case circumferentially opposite said first inner wall portion.

7. The Coriolis flowmeter of claim 6 wherein said case connect link defines:

a substantially flat element extending from said first end to said
second end;

a substantially circular opening in a mid portion of said flat element;

said circular opening receives said flow tube and a ring portion of said lateral mode stabilizer means.

8. A method of increasing frequency separation between a desired drive frequency and an undesired lateral vibration frequency of a Coriolis flowmeter;

said method comprising the steps of;

driving a flow tube and a balance bar of said Coriolis flowmeter in a drive plane at a resonant frequency of said flow tube; said balance bar is coupled to said flow tube;

coupling a lateral mode stabilizer to circumferential side portions of said flow tube for stiffening said side portions with respect to the frequency of lateral vibrations;

said stiffening raises the frequency of said lateral vibrations more than the lateral vibration frequency of said flow tube when not coupled to said lateral mode stabilizer.

9. The method of claim 8 wherein the step of coupling comprises the step of coupling circumferential lateral extensions on said lateral mode stabilizer means to opposing circumferential sides of said flow tube to stiffen said sides of said flow tube with respect to said lateral vibrations.

10. The method of claim 9 further comprising the steps of coupling said flow tube and said lateral mode stabilizer means and said balance bar of said Coriolis flowmeter to a case connect link; and coupling opposing ends of said case connect link to an inner surface of a case enclosing said Coriolis flowmeter.

* * * * *